Feb. 22, 1927.
V. H. LAMBERT
AUTOMATIC TRACTION HITCH
Filed Sept. 25, 1922  2 Sheets-Sheet 1
1,618,714
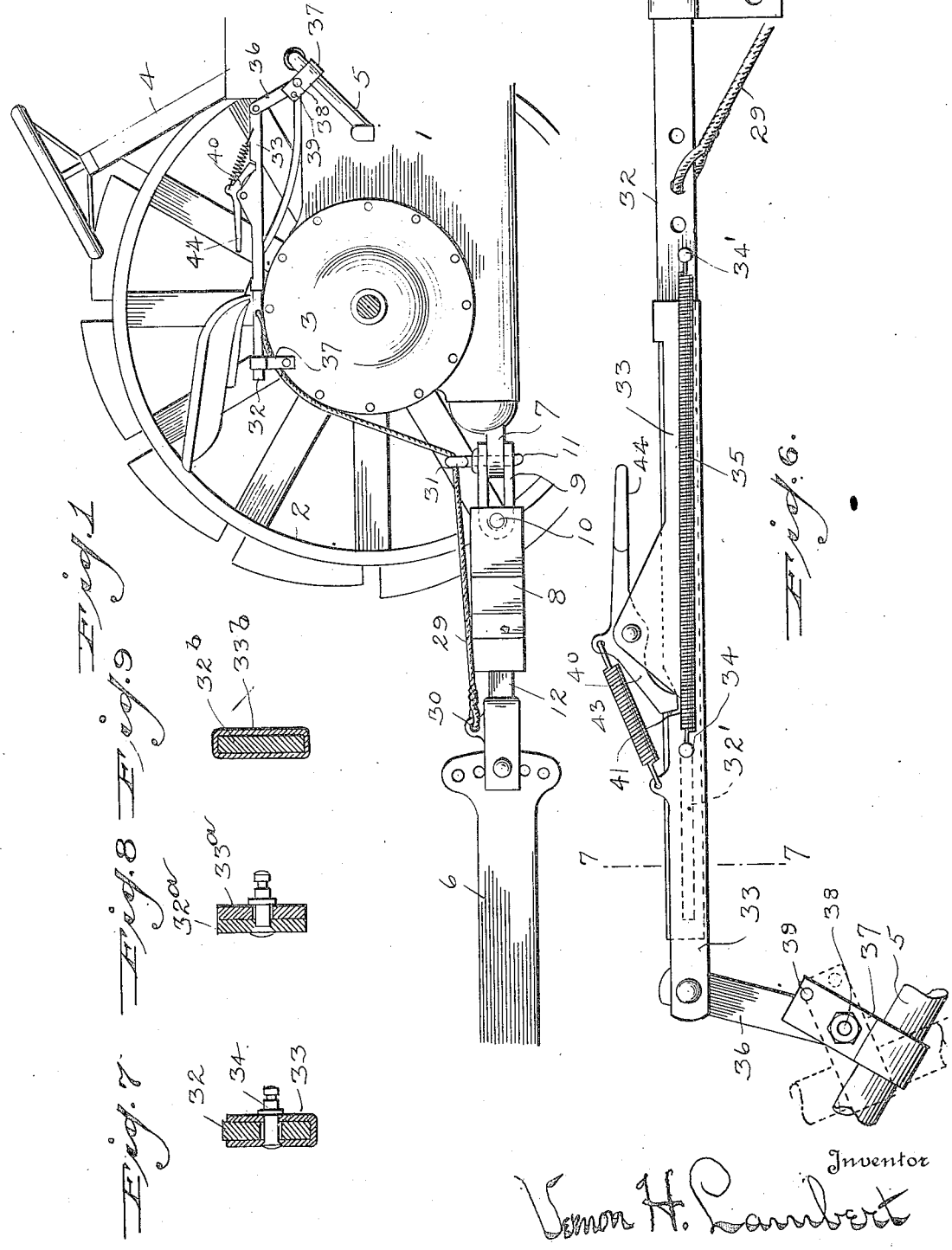

Feb. 22, 1927.  
V. H. LAMBERT  
AUTOMATIC TRACTION HITCH  
Filed Sept. 25, 1922  
1,618,714  
2 Sheets-Sheet 2
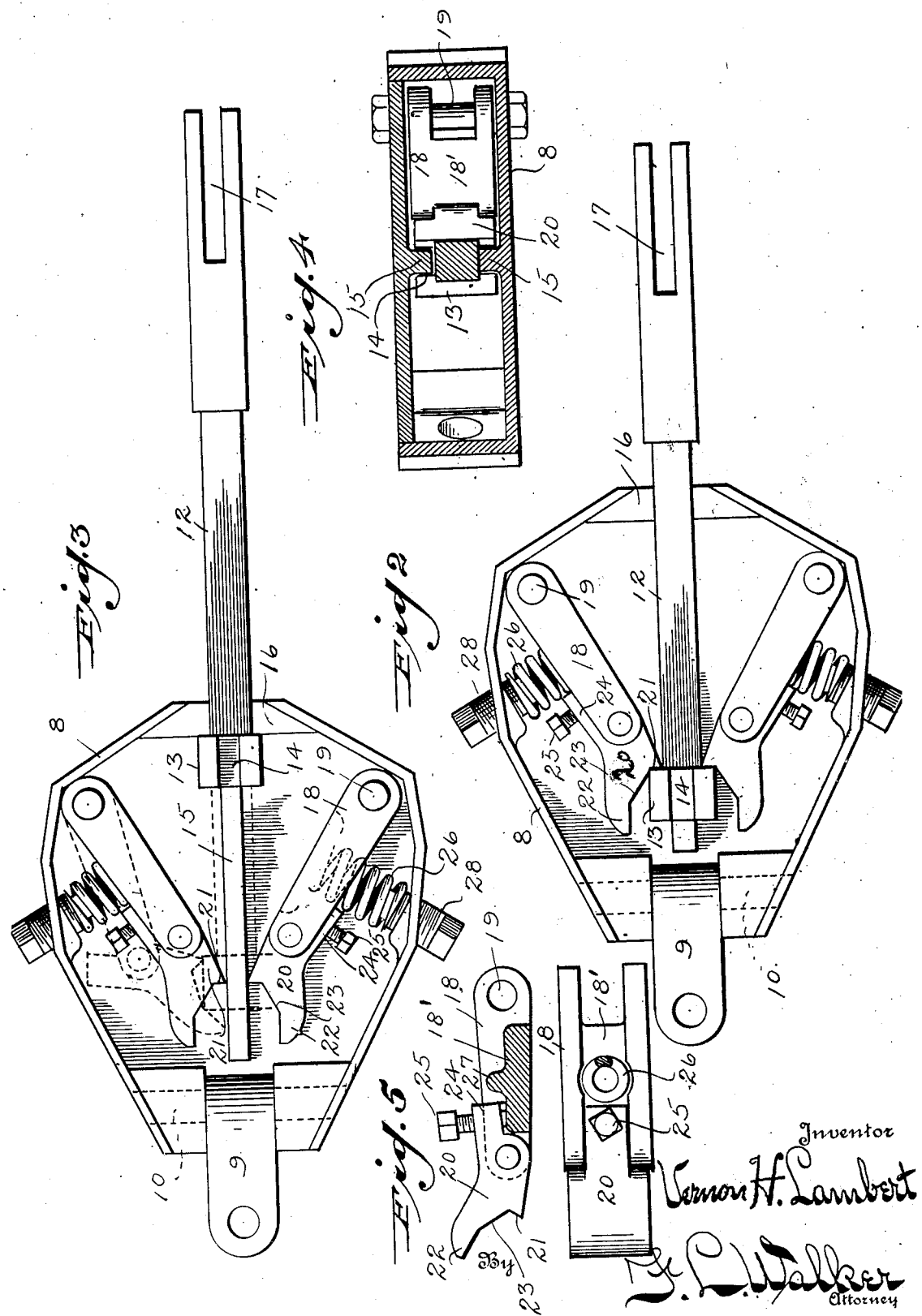

Patented Feb. 22, 1927.

1,618,714

UNITED STATES PATENT OFFICE.

VERNON H. LAMBERT, OF XENIA, OHIO.

AUTOMATIC TRACTION HITCH.

Application filed September 25, 1922. Serial No. 590,403.

My invention relates to draw bar connections for tractor engines and the like and more particularly to a safety hitch or automatically releasable coupling, adapted to yield in the event that the drawn vehicle or implement meets with an obstruction or excessive resistance, such disengagement of the coupling serving to arrest the progress of the tractor.

The invention contemplates a telescopic draw bar connection, the parts of which are relatively movable against yielding resistance of a pair of spring actuated toggle pawls, which upon disengagement permit limited independent movement of the draw bar, which, however, is not wholly disconnected but maintained in relative position for reengagement upon a reversal of the motive power. The relative movement of the parts upon disengagement of the toggle pawl is transmitted through an intermediate connection to a motive power control member such as a clutch lever or the like, whereby the tractor or other motive power is automatically arrested, such intermediate connection having therein an automatic take up device, which may be released to permit the return of the operated power control member to normal position, preparatory to backing the tractor, the take up serving to readjust the operative connection preparatory to the next operation, such intermediate connection with the power control member being of such character as to permit free and independent operation of the control lever or other member to be operated, at the will of the operator independent of its connection with the safety coupling or hitch.

The object of the invention is to simplify the structure as well as the means and mode of operation of tractor hitches, whereby they will not only be cheapened in construction, but will be more efficient in use, positive in operation, uniform in action, durable and unlikely to get out of repair.

A further object of the invention is to provide an automatic safety hitch or coupling, which may be reengaged after being broken with minimum effort, and without necessity for accurate positioning or alignment of the tractor and the drawn implement or vehicle for reengagement. This is effected by limiting the withdrawal of the draw bar to a predetermined range of movement, leaving it connected at the limit of such movement, with means for guiding it back to its normal engaged position.

A further object of the invention is to provide an improved form of yielding toggle pawls or locking arms, for the draw bar.

A further object of the invention is to provide an improved form of take up for the intermediate tractor control connection, which may be easily and readily relieved to permit manipulation of the tractor mechanism and will automatically reengage or reset itself upon the reengagement of the hitch or coupling, preparatory to the succeeding releasing operation.

A further object of the invention is to provide means for attaching the intervening control connection with the tractor in such manner as to afford free and independent manipulation of the tractor parts under normal conditions of operation.

With the above primary and other incidental objects in view as will more fully appear in the specification, the invention consists of the features of construction, the parts and combinations thereof and the mode of operation or their equivalents as hereinafter described and set forth in the claims.

In the accompanying drawings, wherein is shown the preferred, but obviously not necessarily the only form of embodiment of the invention, Fig. 1 is a side elevation of a portion of a tractor and the beam of a drawn implement such as a plow, interconnected by the automatically releasable coupling or safety hitch forming the subject matter hereof. Fig. 2 is a top plan view of the coupler with the parts in their engaged or operated position, the top or lid of the coupler housing being removed. Fig. 3 is a similar view of the coupler with the parts in disconnected or operated relation. Fig. 4 is a transverse sectional view substantially on line 4—4 of Fig. 2. Fig. 5 discloses a top and side elevation, the latter being partly in section of the jointed locking arm or toggle pawl. Fig. 6 is a side elevation of the automatic take up device and yielding connection, by which movement is transmitted to the tractor control mechanism, to arrest the tractor upon disengagement of the coupler. Fig. 7 is a detail sectional view on line 7—7 of Fig. 6. Figs. 8 and 9 are similar views of modifications.

Like parts are indicated by similar characters of reference throughout the several views.

It is recognized that heretofore various forms of coupling devices have been provided which permit a relative advance movement of the tractor or leading vehicle in the event that drawn implement or plow encounters a stone or other obstruction to its progress and that it is not broadly new to employ this relative movement of the drawing and drawn vehicles to render the tractor inoperative. However, the present construction is designed to immediately and entirely release the drawn implement or vehicle of the train, without, however, totally disconnecting it, but maintaining such engagement that the operated parts will be retained in alignment.

Referring to the drawings, 1 is the tractor or draft vehicle of which 2 is the carrying wheel, 3 the differential housing, 4 the steering column and 5 the clutch control lever or pedal. Located to the rear of the tractor is the drawn implement or plow of which only the beam 6 is shown. Interconnecting the plow beam 6 with the draft lug 7 of the tractor is the releasable coupler forming the subject matter hereof. In constructing the coupler, there is employed a housing 8 of substantially ovate form the outside being somewhat polygonal. This housing 8 is connected with the draft lug 7 of the tractor by a clevis 9, engaging about a transverse stud or pin 10 at one end of the housing 8, and transfixed by a coupling pin 11, which also extends through the draft lug 7. Mounted for reciprocatory movement within the coupler housing 8, is a draft bar or draw bar 12, having at its inner end an enlarged head 13, provided with oppositely disposed grooves or notches 14, extending parallel with the draw bar 12. The top and bottom of the housing 8 are provided with longitudinally disposed inwardly-projecting ribs 15, shown particularly in Figs. 3 and 4, which ribs engage within the notches or grooves 14, and afford guide ways for the draw bar to and from its operative or engaged position. The rear end of the housing 8 is re-inforced at 16 to form an abutment or shoulder stop for the draw bar head 13 at the limit of its retractive movement. The rear end of the draw bar 12 is bisected as at 17, or otherwise suitably formed for engagement with the plow beam 6, or with any other type of vehicle to be drawn. The form of connection or attachment of the coupler with the plow or other drawn implement and with the tractor, as by the clevis and coupling pin 11, are immaterial. It is obvious that other forms of connecting means may be substituted. Located within the housing 8 on opposite sides of the draw bar 12, are toggle pawls or jointed retaining arms, each comprising a swinging arm portion 18, pivoted at 19, upon studs mounted in the housing and movable thereabout to and from each other. For convenience of manufacture and assembly these arm portions 18 are preferably bifurcated at their opposite ends and are provided with intermediate web portions 18'. Pivoted intermediate the furcations of the free ends of the swinging arms 18 are the pawl heads or dogs 20. These heads or dogs are formed with offset shoulder portions 21 for engagement with the rearward shoulder of the draw bar head 13, and provided with the extensions or finger like portions 22 extending on opposite sides of the draw bar head and having beveled or inclined faces 23, intermediate the extensions or fingers 22 and the engaging shoulders 21. Each dog or pawl head is provided with a tail portion 24, which overhangs the intermediate web portion 18' of the swinging arm 18, and is provided with an adjusting screw 25 by which the relation or throw of the pawl head in one direction can be adjusted. Interposed between the swinging arms 18 and the adjacent sides of the housing 8 are helical tension springs 26, seating at their inner ends upon the intermediate web portions 18' of the arm 18, which is provided with a projecting stud 27 to form a seat for and center the spring. At their outer ends the tension springs 26 bear upon adjustable screw studs 28, screw threaded in the side walls of the housing 8, by the adjustment of which the tension of the spring may be varied at will. As will be at once apparent by an examination of Fig. 2, the engagement of the draw arm 13 with the offset shoulder 21 of the pawl heads or dogs 20 is slightly out of dead center relation with the pivotal portion of the pawl head and the swinging arm. The relative pull of the housing and the draw bar in opposite directions will then tend to break or buckle the toggle, comprising the swinging arm and the pawl head or dog. In this breaking or buckling movement of the toggle, the swinging arm 18 must necessarily move outward against the tension of its spring 26. It is to be understood that the pawl heads or dogs 20 are entirely free for oscillatory movement about their pivotal connection with the arms 18. In Fig. 3 the position of the arm and pawl head at the extreme throw of the releasing movement is shown by dotted lines. Excessive pull upon the draw bar against the engaging shoulders 21, tends to oscillate the dogs or pawl heads 20 which exert a leverage upon the arm 18 against the spring 26, moving the arm outwardly until the head 13 of the draw bar may pass between the oppositely disposed engaging shoulders 21 of the respective toggle members. As the pivoted dogs or pawl heads approach releasing position the beveled or inclined faces 23 also engage the draw bar head as shown by dotted lines in Fig. 3, affording a fulcrum which materially assists in moving the stop shoulders 21 out of the path of the draw bar head, giving definition and a final accelerated movement to these stop shoulders. Thus the device will resist breakage or releasing influence, until the predetermined degree of resistance is exceeded, whereupon the release movement instead of being gradual and accumulative will be effected comparatively quickly, thus giving instant relief to the obstructed drawn vehicle. With the stop shoulders 21 shifted out of the path of the draw bar head, the draw bar is free to move rearward within the housing through limited range of movement. In practice it is found that this movement need not exceed a stroke of six inches, although the proportions and relative movement of the parts may be modified and changed to meet various conditions of use. The finger like extensions 22 of the dogs or pawl heads, when in extreme operative position, approach closely to the guide ribs 15, upon the top and bottom of the housing 8, and serve to prevent accidental overthrow of the heads or dogs when the draw bar is released.

If it were not for these extensions 22, the pawl heads might occasionally be thrown to an abnormal position, wherein they would become interlocked with the guide ribs 15 upon the reaction of the spring 26 and so interfere with or prevent the resetting of the parts. Upon the disengagement of the draw bar from the toggle arm, the springs 26 by their reaction will return the arms and their pawl head to the positions shown by solid lines in Fig. 3, ready for reengagement of the draw bar head upon its retrograde movement. The draw bar 12 is never wholly disengaged or withdrawn from the housing 8. At the extreme limit of its reciprocatory movement the head 13 is arrested by reenforcement stop shoulders 16 of the housing. However, there will seldom or never be direct or forcible engagement of the draw bar head and the shoulders 16 for before the head has reached the limit of its possible range of movement, the tractor will have been arrested by the disengagement of its driving clutch. To this end there is provided an intermediate connection between the tractor and the coupler comprising a cable 29 connected at 30 to the protruding portion of the draw bar 12 and extending thence preferably though not necessarily, through an eye 31 in the head of the coupling pin 11 and connected to a reciprocatory bar 32, having operative engagement with the clutch pedal 5 of the tractor. In order to provide a take up device as before mentioned, the reciprocatory bar is formed in two sections, having relative longitudinal movement. These may be merely two flat bars arranged side by side as shown in the sectional detail view Fig. 8. However, the preferable form is to provide a sleeve or channel 33, within which the primary bar 32 is mounted for reciprocation. In the construction shown in the drawings, the reciprocatory bar 32 is provided with a longitudinal slot 32' as shown by dotted lines in Fig. 7, through which extends a stud or pin 34, carried by the channel bar 33, which while permitting relative longitudinal or telescopic movement of the bars 32 and 33 limits this movement to the length of the slot 32'. A helical spring 35 is connected at one end to the stud or pin 34 and at its opposite end to a second pin 34' carried by the primary bar 32, which spring tends to retract the bars 32 and 33, one toward the other. The forwardly extending end of the telescopic bar is pivotally connected to a rock arm 36, mounted upon the clutch lever or pedal 5 for idle movement in one direction, but adapted when moved in the opposite direction to carry the clutch pedal 5 with it. To this end a U-shaped bracket or clip 37 is clamped about the clutch pedal arm 5 with the rock arm 36 pivoted between the ends of the U-shaped bracket or clip 37 upon the stud 38. A pin or stud 39 carried by the clip or bracket 37, extends into the path of movement of the lever 36 when moved rearwardly. This arrangement permits the clutch pedal 5 to be oscillated downwardly and forwardly thru its normal movement independent of the rock lever 36, but in the event that the rock lever is oscillated by retraction of the telescopic bars 32—33, the clutch pedal is thereby operated through its operative stroke. Thus in the normal operation of a tractor, the clutch pedal may be manipulated by the driver independent of and without interference with the coupler take up mechanism, but is under control of the coupler in the event that the coupler or interconnection is disengaged.

The telescopic bars 32—33 are normally interconnected one with the other by means of a locking lever or pawl 40, mounted upon the bar 33 and engaging a notch 41, in the reciprocatory bar 32. This locking lever or pawl 40 is actuated into and retained in locking relation by means of a spring 43 against the tension of which it may be withdrawn from the notch 41, by manual pressure of the handle or operating extension 44. For convenience the operating cable 29 has been shown as being guided over the top of the differential housing 3. Any other form of support or guide may be utilized and if the clutch pedal or other control member is located sufficient distance from the automatic coupling device, the cable 29 may pass from the coupler direct to its connection with the take up bar.

In operation the toggle pawl or retaining arms disengage the head 13 of the draw bar whenever the plow or other trailing implement or vehicle encounters an obstruction sufficient to accord abnormal resistance. This resistance is transmitted through the draw bar 12 to the shoulders 21 of the pawl heads or dogs 20, with which the head 13 engages. This point of contact of the draw bar head 13 with the dog being slightly out of dead center relation with the pivotal joints of the retaining arms, buckles or breaks these toggle arms against the tension of their respective springs 26. As the pawl heads or dogs turn under such pull of the respective implements or vehicles, the inclined faces 23 of the pawls or dogs 20 come in contact with the draw bar head 13 to form fulcrums or bearing points facilitating the movement of the pawl heads to more quickly withdraw the stop shoulders 21, thereby causing the pawls or dogs to release the draw bar head quickly when once the releasing operation has been initiated. Before the draw bar and housing can relatively move to the limits of their possible range of movement, wherein the head 13 would engage the stop shoulders 16, the movement of the tractor in relation with the plow or trailer implement will be sufficient to tension the cable 29 to draw the telescopic bars 32—33 rearwardly as the tractor continues to advance, thereby oscillating the clutch pedal 5 to disengage the clutch and arrest the tractor. The tractor is thus brought to a stop before the draw bar head engages the stop shoulder 16, at the end of the housing, the draw bar still retaining its guiding relation with the ribs 15 of the coupler housing 8. The tractor thus having been automatically stopped cannot be again started nor backed to permit reengagement of the coupler until the clutch pedal 5 is released to permit reengagement of the driving clutch. To release the clutch pedal the driver will depress the handle or lever of the detent or locking pawl 40 of the take up device, thereby withdrawing the nose of the pawl from the notch 41.

The clutch pedal 5 or control levers of the tractor are provided with retracting springs which return the clutch pedal after each operation. Upon the disengagement of the telescopic bars 32—33 by the release of the pawl 40 from the notch 41, this clutch pedal spring, which is not shown on the drawing, but which is a part of every tractor mechanism will by its reaction return the clutch pedal to its normal position, advancing with it the bar 33 carrying the engaging pawl 40. In this movement the spring 35 is extended and placed under tension. It will be understood that the clutch pedal spring is of greater strength than the spring 35. The clutch pedal having thus been released and the driving clutch reengaged the tractor is backed under power to slide the coupler housing 8 rearwardly upon the draw bar 12 until the head 13 passes between and beyond the engaging dogs 20 of the toggle arms, during which movement the take up spring 35 will have retracted the sliding bar 32 and cable 29 until the notch 41 again comes opposite the locking pawl 40, which drops thereinto, thus resetting the parts preparatory to the next operation.

While the telescopic take up bar preferably comprises a bar 32 reciprocating within the channel bar 33, as shown in detail in Fig. 7, these members may comprise two flat bars $32^a$ and $33^a$ arranged side by side as shown in Fig. 8, or the reciprocatory bar may be enclosed within the flat tube as shown at $32^b$ and $33^b$ in Fig. 9.

From the above description it will be apparent that there is thus provided a device of the character described possessing the particular features of advantage before enumerated as desirable, but which obviously is susceptible of modification in its form, proportions, detail construction and arrangement of parts without departing form the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is therefore claimed in any of its forms or modifications within the legitimate and valid scope of the appended claims.

Having thus described my invention, I claim:

1. In a releasing coupler, of the character described, two telescopic members to be connected with leading and trailing vehicles respectively, a pair of toggle pawl arms arranged in opposite relation upon one of the telescopic members and engaging the other member, springs against the tension of which the opposite pawl arms yield to release the engaged member under predetermined pulling influence, means for limiting the telescopic movement of the members whereby they will be maintained in engagement one with the other, and guiding means by which the members are guided during retrograde adjustment to their engaging relation.

2. As an article of manufacture, an automatic stop device for a tractor vehicle having a movable control member, to which tractor a drawn vehicle is connected by a releasable hitch, upon the disengagement of which the stop device becomes operative, comprising a pair of relatively adjustable bars, one of the bars being connected to the draft vehicle control member and the other bar being connected to the drawn vehicle, and a detent detachably interconnecting the bars one with the other, whereby the relative movement of the draft and drawn vehicles upon release of the coupling will exert a pulling strain upon the interconnected bars to effect the operation of the draft vehicle control member, the detent being releasable, and the bars being capable of relative movement upon release of the detent, and said control member being capable of return movement upon the relative movement of the bars, said control member upon restoration enabling the return of the draft and drawn vehicles to coupled relation, said bars being returned to the control of the detent upon the re-coupling of the vehicles.

3. As an article of manufacture, an automatic stop device for a tractor vehicle having a movable control member, to which tractor a drawn vehicle is connected by a releasable hitch, upon the disengagement of which the stop device becomes operative, comprising a trip connection between the drawn vehicle and the movable control member of the draft vehicle operable upon relative movement of the drawn and draft vehicles after detachment of their coupling to actuate the control member, a releasable detent for said trip connection, said control member being released for return movement by the release of the trip connection detent, and means for effecting the reengagement of the detent with the trip connection upon the return of the draft and drawn vehicles to coupled relation.

4. As an article of manufacture, an automatic stop device for a tractor vehicle having a movable control member, to which tractor a drawn vehicle is connected by a releasable hitch, upon the disengagement of which the stop device becomes operative, comprised of an extensible and contractible trip connection operatively connecting the control member of the draft vehicle with the drawn vehicle, said trip connection being actuated by relative movement of said vehicles, the control member being automatically operated by the actuation of the trip connection, means normally resisting the extension of said trip connection during its operation of said control member and thereafter operable to permit the extension of said trip connection to enable the return of the control member, said connection being automatically contractible to normal resistant condition upon the recoupling of the draft and drawn vehicles.

5. In an extensible coupling of the character described, a draw bar having oppositely disposed engaging shoulders, pivoted jointed arms arranged on opposite sides of the draw bar and engaging said shoulders with equalized pressure in relation slightly offset from dead center relation with the pivotal joints of the respective arms, and tension springs for said arms against the influence of which said arms yield to release the draw bar when subjected to abnormal pulling effort, the equalized pressure of the yielding arms on opposite sides of the draw bar serving to guide the draw bar during its retrograde movement with minimum resistance to such movement to re-engaging position.

6. In a releasable tractor hitch construction, the combination with an automatically extensible coupling between the tractor and a trailing vehicle, of a connection to the motive control mechanism of the tractor operated by the extension of said coupling to arrest the progress of the tractor, including a reciprocatory telescopic bar, a manually releasable detent normally interconnecting the members of the telescopic bar and a retracting spring for the bars tending to move the bars to position to be interconnected by said detent, one of said bars being connected with the motive control mechanism of the tractor, the other member being movable by the relative movement of the tractor and trailing vehicle and transmitting movement through the interengaging detent to the first member to actuate the motive control mechanism of the tractor.

7. A releasable tractor hitch of the character described wherein a tractor and a trailing vehicle are interconnected by a coupler releasable under influence of abnormal pulling effort characterized by a separable connection between the trailing vehicle and the motive control mechanism of the tractor, means for detachably connecting the separable parts of such connection positively one with the other, and a retracting spring against the tension of which the parts are relatively movable when disconnected, said retracting spring being adapted to return the parts to normal engaged position upon return of the tractor and trailing vehicle to hitched relation.

8. A tractor hitch wherein a tractor and trailing vehicle are interconnected by a coupler adapted to yield under influence of abnormal pulling effort, characterized by an actuating connection for the motive control mechanism of the tractor operated by the relative movement of the tractor and trailing vehicle upon yielding of the coupler, an automatic take up device in said actuating connection, and means for positively locking said take up device against operation during normal operation of the tractor and trailing vehicle, said take up means being effective during retrograde movement of the tractor after operation of the coupler for resetting the actuating connection.

9. A tractor hitch wherein a tractor and a trailing vehicle are interconnected by a coupler adapted to yield under influence of abnormal pulling effort, characterized by a spring tensioned motive power control member for the tractor, an actuating connection for the power control member operated by the relative movement of the tractor and trailing vehicle upon the yielding of said coupler, to move the power control member against the tension of its spring, a releasable coupler in said actuating connection permitting the return of the power control member under the influence of its tension spring and a retracting spring for the actuating connection tensioned by the return of said power control member to return the connection to operative condition upon retrograde movement of the tractor.

10. A draft connection of the class described, including a drawn member, a tractor member having a control element, a yielding coupling connecting the tractor and drawn member, two telescopic members, operatively connected with the tractor control element and operative in unison upon the yielding of the coupling to operate the control element, interconnecting means normally connecting the telescopic members for unison operation, said interconnecting means being releasable to permit the telescopic members to compensate for return operation of the control element and the retraction of the vehicles to their normally coupled relation.

In testimony whereof, I have hereunto set my hand this 20th day of September A. D. 1922.

VERNON H. LAMBERT.